US010291648B2

United States Patent
Giura et al.

(10) Patent No.: US 10,291,648 B2
(45) Date of Patent: May 14, 2019

(54) SYSTEM FOR DISTRIBUTING VIRTUAL ENTITY BEHAVIOR PROFILING IN CLOUD DEPLOYMENTS

(71) Applicant: AT&T INTELLECTUAL PROPERTY I, L.P., Atlanta, GA (US)

(72) Inventors: Paul Giura, Cairo, NY (US); Gustavo de los Reyes, Fair Haven, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 210 days.

(21) Appl. No.: 14/978,971

(22) Filed: Dec. 22, 2015

(65) Prior Publication Data
US 2017/0180416 A1    Jun. 22, 2017

(51) Int. Cl.
*H04L 29/06*     (2006.01)
*G06F 9/455*     (2018.01)

(52) U.S. Cl.
CPC ...... *H04L 63/1458* (2013.01); *G06F 9/45558* (2013.01); *H04L 63/1425* (2013.01); *G06F 2009/45587* (2013.01); *G06F 2009/45591* (2013.01); *G06F 2009/45595* (2013.01)

(58) Field of Classification Search
CPC ........... H04L 63/1458; H04L 63/45558; H04L 63/1425
USPC ........................................................ 726/23
See application file for complete search history.

(56) References Cited

U.S. PATENT DOCUMENTS

| 7,290,266 | B2 | 10/2007 | Gladstone et al. |
| 7,627,671 | B1 | 12/2009 | Palma et al. |
| 7,712,095 | B2 | 5/2010 | Toyota et al. |
| 8,079,030 | B1 * | 12/2011 | Satish ............... H04L 63/20 713/164 |
| 8,447,510 | B2 | 5/2013 | Fitzpatrick et al. |

(Continued)

FOREIGN PATENT DOCUMENTS

| CN | 103036721 | 4/2013 |
| WO | 2014160479 | 10/2014 |

OTHER PUBLICATIONS

Dolgikh et al., "Behavioral Modeling for Suspicious Process Detection in Cloud Computing Environments." Mobile Data Management (MDM), 2013 IEEE 14th International Conference on. vol. 2. IEEE, 2013, document of 5 pages. http://harvey.binghamton.edu/~ychen/mCloud2013_cameraReady.pdf.

(Continued)

*Primary Examiner* — Dant B Shaifer Harriman
(74) *Attorney, Agent, or Firm* — Akerman LLP; Michael K. Dixon; Mammen (Roy) P. Zachariah, Jr.

(57) ABSTRACT

A system for distributing virtual entity behavior profiling in cloud deployments is disclosed. In particular, the system may include conducting entity behavior profiling closer to where data and data logs are generated, such as at a hypervisor server, in a distributed fashion. By doing so, the system may reduce bandwidth consumption typically associated with transferring data to a central processing system, may be able to use more data collected closer to sources of data generation, and may provide faster reaction times because of the faster processing of data enabled by the system. Additionally, the system may assist with reducing false positives associated with malware detection and other compromises associated with entities by aggregating the results of distributed computations at different sites.

20 Claims, 10 Drawing Sheets

(56) References Cited

U.S. PATENT DOCUMENTS

| | | | |
|---|---|---|---|
| 8,495,611 B2 | 7/2013 | McCarthy et al. | |
| 8,533,833 B2 | 9/2013 | Gaist | |
| 8,589,541 B2 | 11/2013 | Raleigh et al. | |
| 8,639,814 B2 | 1/2014 | Jung et al. | |
| 8,732,791 B2 | 5/2014 | Choudrie | |
| 8,954,562 B2 | 2/2015 | Vicente | |
| 8,955,108 B2 | 2/2015 | Neystadt et al. | |
| 9,027,011 B1* | 5/2015 | Lam | G06F 9/44505 717/158 |
| 9,027,135 B1* | 5/2015 | Aziz | H04L 63/1408 726/23 |
| 9,038,193 B2 | 5/2015 | Burgess et al. | |
| 9,117,091 B2 | 8/2015 | Tucker | |
| 9,130,901 B2 | 9/2015 | Lee | |
| 9,213,556 B2* | 11/2015 | Abiezzi | H04N 19/46 |
| 9,223,962 B1* | 12/2015 | Kashyap | G06F 21/566 |
| 2013/0097706 A1 | 4/2013 | Titonis et al. | |
| 2014/0258446 A1 | 9/2014 | Bursell | |
| 2015/0052520 A1* | 2/2015 | Crowell | G06F 21/53 718/1 |
| 2015/0154494 A1 | 6/2015 | Medvedovsky et al. | |
| 2015/0163121 A1* | 6/2015 | Mahaffey | G06F 11/0766 707/687 |
| 2015/0172311 A1 | 6/2015 | Freedman et al. | |
| 2016/0359912 A1* | 12/2016 | Gupta | H04L 63/1425 |
| 2017/0180416 A1* | 6/2017 | Giura | H04L 63/1458 |

OTHER PUBLICATIONS

Kim et al., "CometCloud: An autonomic cloud engine." Cloud Computing: Principles and Paradigms (2011): 275-297. http://personal.cac.rutgers.edu/TASSL/Papers/wiley-2011.pdf.

Huang et al., "TWMAN+: A Type-2 fuzzy ontology model for malware behavior analysis." Systems, Man, and Cybernetics (SMC), 2012 IEEE International Conference on. IEEE, 2012, document of 7 pages. http://www.researchgate.net/profile/Ton_Ton_Huang/publication/236615800_TWMAN__A_Type-2_Fuzzy_Ontology_Model_for_Malware_Behavior_Analysis/links/004635184b5c492cb9000000.pdf.

Watson et al. "Towards a distributed, self-organising approach to malware detection in cloud computing." Self-Organizing Systems. Springer Berlin Heidelberg, 2014. 182-185. https://seccrit.eu/upload/Watson-IWSOS-2013.pdf.

Doelitzscher et al. "An agent based business aware incident detection system for cloud environments." Journal of Cloud Computing 1.1 (2012): 1-19. http://link.springer.com/article/10.1186/2192-113X-1-9/fulltext.html.

* cited by examiner

SYSTEM FOR DISTRIBUTING VIRTUAL ENTITY BEHAVIOR PROFILING IN CLOUD DEPLOYMENTS

FIELD OF THE INVENTION

The present application relates to network security technologies, system behavior profiling technologies, cloud-based technologies, and information protection technologies, and more particularly, to a system and method for distributing virtual entity behavior profiling in cloud deployments.

BACKGROUND

In today's society, users and organizations regularly utilize network and other service providers to gain access to the Internet, access software services, request and receive various types of content, access software applications, and perform a variety of other tasks and functions. As users and organizations have become comfortable with such technologies, an increasing number of such users and organizations have become accustomed to utilizing and interacting with cloud-based technologies to provide the services and content they desire. As a result, there has been an ever-increasing adoption of cloud-based deployments, which utilize a host of entities to provide the services and applications utilized by users and organizations. Such entities may include, but are not limited to, servers, virtual machines, hypervisors, tenants, switches, databases, other entities, or any combination thereof. In order to ensure that such entities are performing as expected, service providers have deployed network log analysis infrastructures to attempt to keep up with the processing demands of all the data generated from such entities. Such network log analysis infrastructures may be utilized to determine entity behaviors and to determine whether entities have been compromised, such as by malware.

While current network log analysis infrastructures provide for many benefits and efficiencies, current technologies still have many shortcomings. In particular, current network log analysis infrastructures are already struggling to keep up with the processing demands associated with processing the data generated from entities. Additionally, when the number of entities to monitor increases by a thousand-fold or million-fold, current network log analysis infrastructures will be unable to handle the processing demands that will occur as a result of such increases. Furthermore, current log analysis systems record network transaction events at specific network elements and then transport the logs associated with the events to a central processing system for processing. Such central processing systems often become overloaded with processing the data and significant delays in processing the data may result in long reaction times. As a result, current methodologies and technologies associated with processing data generated from entities may be modified so as to provide enhanced quality-of-service and to provide enhanced malware detection capabilities. Such enhancements and improvements to methodologies and technologies may provide for improved processing capabilities, increased security, and increased ease-of-use.

SUMMARY

A system and accompanying methods for distributing virtual entity behavior profiling in cloud deployments are disclosed. In particular, the system and methods may involve conducting entity behavior profiling closer to where data and data logs are generated, such as at a hypervisor server, in a distributed fashion. By doing so, the system and methods may reduce bandwidth consumption typically associated with transferring data to a central processing system, may be able to use more data collected closer to sources of data generation, and may provide faster reaction times because of the faster processing of data enabled by the system and methods. Additionally, the system and methods may assist with reducing false positives associated with malware detection and other compromises associated with entities by aggregating the results of distributed computations at different sites. In order to accomplish the foregoing, the system and methods may include distributing the collection and processing of network element data log records at the physical computation nodes (e.g. hypervisor servers) rather than transporting the data logs to a central processing system to conduct behavior profiling analysis.

In particular, the system and methods may include accessing and storing, at a hypervisor server, logs including data associated with activities performed by and/or associated with an entity (e.g. virtual machine) executing on the hypervisor server during a first selected time period. Once the logs including the data are accessed and/or stored, the system and methods may include executing any number of behavior profiling algorithms on the data contained in the logs. In certain embodiments, the data included in the logs may be efficiently compressed/encoded in a format that is only usable and/or known to the behavior profiling algorithms. When executing the behavior profiling algorithms on the data contained in the logs, the system and methods may include comparing a historical behavior profile for the entity containing historical behavior data for a second selected time period. The system and methods may then proceed to determine if a change in behavior for the entity has occurred based on executing the behavior profiling algorithms on the data included in the logs. For example, the change in behavior may be that a virtual machine has accessed an unknown destination that was not indicated as being previously accessed in the historical behavior profile.

If a change in behavior has been determined to have occurred and the change in behavior exceeds a threshold, the system and methods may include generating a report including the data in the log and more intelligence associated with the data collected during the first selected time period. The more intelligence may include, but is not limited to, a number of ports accessed by the entity, an identification of the ports accessed by the entity, a number of bytes transmitted during the first selected time period, a minimum-maximum average throughput, standard deviation values from values in the historical behavior profile, an identification of malicious entities that compromised the monitored entity, an identification of accepted connections made by the entity, an identification of changes in entity behavior, an identity of a number of connections made by the entity, an identification of internet protocol addresses that are victims of malware and/or a cyber-attack, any identification of times when the behavior of the entity deviates from the historical behavior profile, any other information, or any combination thereof. Additionally, the system and methods may utilize whitelists to confirm whether a particular entity was compromised or not, whether a particular address is associated with a malicious entity, whether deviations in entity behavior are to be expected, or any combination thereof. Furthermore, the system and methods may incorporate the use of bloom filters to detect various types of other compromises associated with entities, such as whether an entity has been compromised by malware. Based on the foregoing, the system and methods may provide a behavior profiling infrastructure that is efficient at processing large amounts of network logs in a shorter period of time, while simultaneously enabling faster detection of malicious activities and enabling better resource utilization compared to existing technologies.

In one embodiment, a system for distributing virtual entity behavior profiling in cloud deployments is disclosed. The system may include a memory that stores instructions and a processor that executes the instructions to perform various operations of the system. The system may perform an operation that includes accessing, at a hypervisor server, a log including data associated with activities performed by a virtual machine executing on the hypervisor server. The activities performed by the virtual machine may be performed by the virtual machine during a first time period. The system may then perform an operation that includes executing a behavior profiling algorithm on the data associated with the activities performed by the virtual machine. Executing the behavior profiling algorithm on the data may include comparing a historical behavior profile for the virtual machine for a second period of time to the data associated with the activities performed by the virtual machine during the first period of time. Additionally, the system may perform an operation that includes determining if a change in behavior for the virtual machine has occurred based on executing the behavior profiling algorithm on the data associated with the activities performed by the virtual machine. Furthermore, the system may perform an operation that includes generating, if the change in behavior is determined to have occurred and if the change in behavior exceeds a threshold, a report including the data associated with the activities performed by the virtual machine.

In another embodiment, a method for distributing virtual entity behavior profiling in cloud deployments is disclosed. The method may include utilizing a memory that stores instructions, and a processor that executes the instructions to perform the various functions of the method. In particular, the method may include accessing, at a hypervisor server, a log including data associated with activities performed by a virtual machine executing on the hypervisor server. In certain embodiments, the activities may be performed by the virtual machine during a first time period. Additionally, the method may include executing a behavior profiling algorithm on the data associated with the activities performed by the virtual machine. Executing the behavior profiling algorithm on the data may include comparing a historical behavior profile for the virtual machine for a second period of time to the data associated with the activities performed by the virtual machine during the first period of time. Furthermore, the method may include determining if a change in behavior for the virtual machine has occurred based on executing the behavior profiling algorithm on the data associated with the activities performed by the virtual machine. Moreover, the method may include generating, if the change in behavior is determined to have occurred and if the change in behavior exceeds a threshold, a report including the data associated with the activities performed by the virtual machine.

According to yet another embodiment, a computer-readable device having instructions for distributing virtual entity behavior profiling in cloud deployments is provided. The computer instructions, which when loaded and executed by a processor, may cause the processor to perform operations including: accessing, at a hypervisor server, a log including data associated with activities performed by a virtual machine executing on the hypervisor server, wherein the activities are performed by the virtual machine during a first time period; executing a behavior profiling algorithm on the data associated with the activities performed by the virtual machine, wherein executing the behavior profiling algorithm on the data comprises comparing a historical behavior profile for the virtual machine for a second period of time to the data associated with the activities performed by the virtual machine during the first period of time; determining if a change in behavior for the virtual machine has occurred based on executing the behavior profiling algorithm on the data associated with the activities performed by the virtual machine; and generating, if the change in behavior is determined to have occurred and if the change in behavior exceeds a threshold, a report including the data associated with the activities performed by the virtual machine.

These and other features of the systems and methods for distributing virtual entity behavior profiling in cloud deployments are described in the following detailed description, drawings, and appended claims.

DETAILED DESCRIPTION OF THE INVENTION

Figure 4:
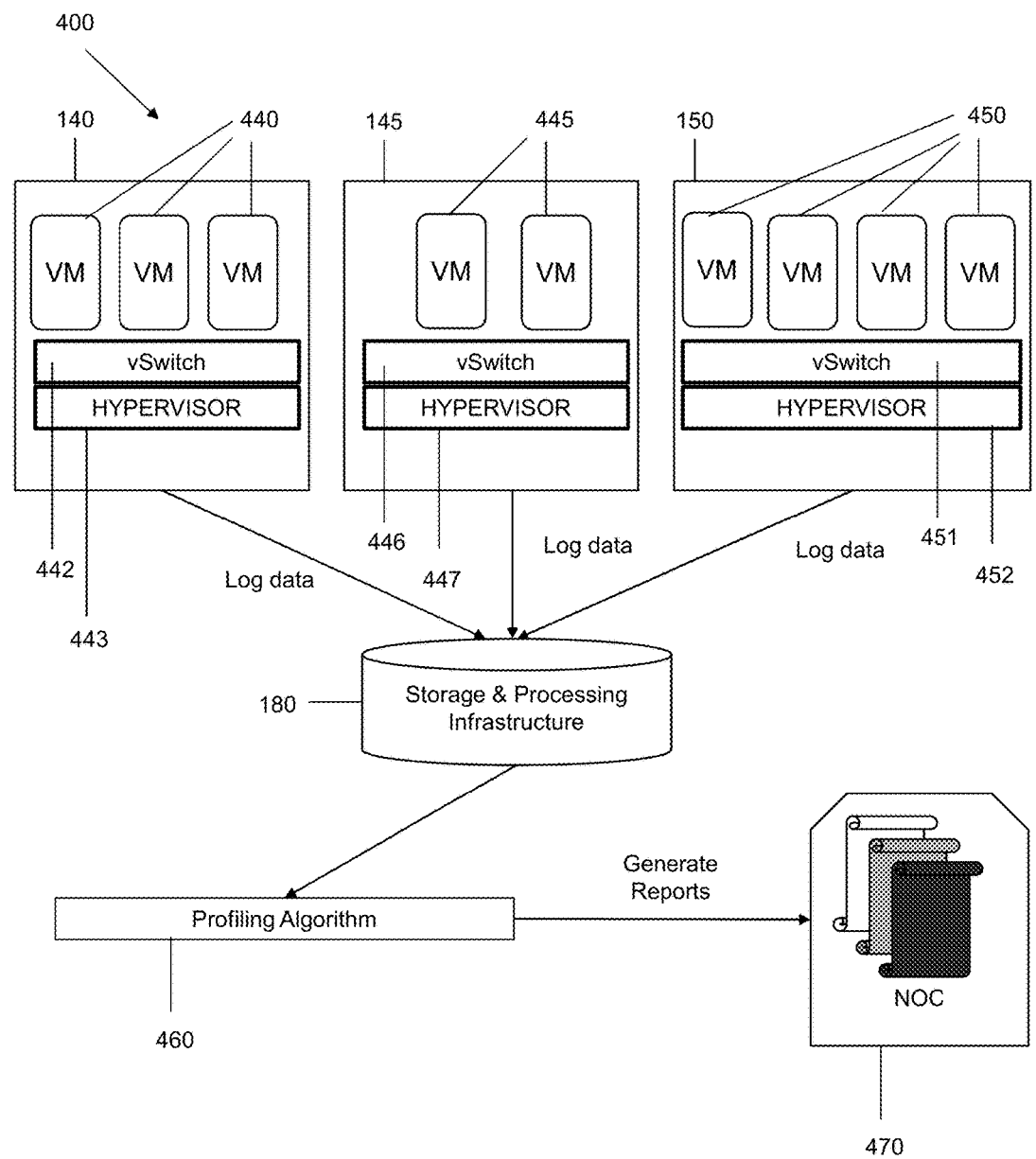
FIG. 4 illustrates a schematic diagram depicting an example scenario for conducting traditional behavior profiling.

A system 100 and accompanying methods for distributing virtual entity behavior profiling in cloud deployments are disclosed. In particular, the system 100 and methods may involve conducting entity behavior profiling closer to where data and data logs are generated, such as at a hypervisor server (e.g. hypervisors 443, 447, 452), in a distributed fashion. By doing so, the system 100 and methods may reduce bandwidth consumption typically associated with transferring data to a central processing system, may be able to use more data collected closer to sources of data generation, and may provide faster reaction times because of the faster processing of data enabled by the system 100 and methods. Additionally, the system 100 and methods may assist with reducing false positives associated with malware detection and other compromises associated with entities by aggregating the results of distributed computations at different sites. In order to accomplish the foregoing, the system 100 and methods may include distributing the collection and processing of network element data log records at the physical computation nodes (e.g. hypervisor servers) rather than transporting the data logs to a central processing system, such as central processing system 180 as shown in FIG. 4, to conduct behavior profiling analysis.

In particular, the system 100 and methods may include accessing and storing, at a hypervisor server, logs including data associated with activities performed by and/or associated with an entity (e.g. virtual machines 440, 445, 450) executing on the hypervisor server during a first selected time period. Once the logs including the data are accessed and/or stored, the system 100 and methods may include executing any number of behavior profiling algorithms 460 on the data contained in the logs. In certain embodiments, the data included in the logs may be efficiently compressed/encoded in a format that is only usable and/or known to the behavior profiling algorithms 460. When executing the behavior profiling algorithms 460 on the data contained in the logs, the system 100 and methods may include comparing a historical behavior profile 206 for the entity containing historical behavior data for a second selected time period. The system 100 and methods may then proceed to determine if a change in behavior for the entity has occurred based on executing the behavior profiling algorithms 460 on the data included in the logs. For example, the change in behavior may correspond with a virtual machine accessing an unknown destination that was not indicated as being previously accessed in the historical behavior profile 206.

If a change in behavior has been determined to have occurred and the change in behavior exceeds a threshold, the system 100 and methods may include generating a report 212 including the data in the log and more intelligence associated with the data collected during the first selected time period. The more intelligence may include, but is not limited to, a number of ports accessed by the entity, an identification of the ports accessed by the entity, a number of bytes transmitted during the first selected time period, a minimum-maximum average throughput, standard deviations from values in the historical behavior profile 206, an identification of malicious entities that compromised the monitored entity, an identification of accepted connections made by the entity, an identification of changes in entity behavior, an identity of a number of connections made by the entity, an identification of internet protocol addresses that are victims of malware and/or a cyber-attack, any identification of times when the behavior of the entity deviates from the historical behavior profile 206, any other information, or any combination thereof. Additionally, the system 100 and methods may utilize whitelists 602 to confirm whether a particular entity was compromised or not, whether a particular address is associated with a malicious entity, whether deviations in entity behavior are to be expected, or any combination thereof. Furthermore, the system 100 and methods may incorporate the use of bloom filters to detect various types of other compromises associated with entities, such as whether an entity has been compromised by malware. As a result, the system 100 and methods may provide a behavior profiling infrastructure that is efficient at processing large amounts of network logs in a shorter period of time that existing technologies, while simultaneously enabling faster detection of malicious activities and enabling better resource utilization compared to existing technologies.

As shown in FIGS. 1-3 and 5-7, a system 100 for distributing virtual entity behavior profiling in cloud deployments is disclosed. The system 100 may be configured to support, but is not limited to supporting, network security services, content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. In certain embodiments, the first user 101 may be a subscriber of a service provider that controls communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface (e.g. screen, monitor, graphical user interface, etc.) that may enable the first user 101 to interact with various applications executing on the first user device 102 and to interact with the system 100. In certain embodiments, the first user device 102 may be a computer, a laptop, a set-top-box, a tablet device, a phablet, a server, a mobile device, a smartphone, a smart watch, and/or any other type of computing device. Illustratively, the first user device 102 is shown as a smartphone device in FIG. 1.

In certain embodiments, the first user device 102 may have any number of software applications and/or application services stored and/or accessible thereon. For example, the first user device 102 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first user 101 to readily interact with the software applications. The software applications and services may also be utilized by the first user 101 to interact with any device in the system 100, any network in the system 100, or any combination thereof. In certain embodiments, the first user device 102 may include associated telephone numbers, device identities, or any other identifiers to uniquely identify the first user device 102.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135, such as but not limited to server 170 of communications network 165. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a network including virtual machines, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. In certain embodiments, the servers 140, 145, and 150 may assist in performing the various operations and functions provided by the system 100, and may be utilized to host virtual machines (e.g. virtual machines 440, 445, 450), which may reside above hypervisors (e.g. hypervisors 443, 447, 452). In certain embodiments, the servers 140, 145, 150 themselves may serve as the hypervisors 443, 447, 452 and, as a result, may be hypervisor servers. However, in certain embodiments, the hypervisors 443, 447, 452 may be hypervisor software executing on the servers 140, 145, 150 respectively, and the servers 140, 145, 150 may serve as host machines for the hypervisors 443, 447, 452. In certain embodiments, the hypervisors 443, 447, 452 may be software, hardware, firmware, or any combination thereof. In certain embodiments, the hypervisors 443, 447, 452 may create and run virtual machines, such as but not limited to, virtual machines 440, 445, 450. Any number of virtual machines 440, 445, 450 may be created and run by the hypervisors 443, 447, 452. In certain embodiments, the hypervisors 443, 447, 452 may include any functionality associated with traditional hypervisors. The virtual machines may be software applications that are configured to execute on the servers 140, 145, 150.

In certain embodiments, the servers 140, 145, and 150 may include vSwitches 442, 446, and 451 respectively. The vSwitches 442, 446, 451 may be software implementations of virtual multiplayer network switches, which may be utilized to enable network automation and include any of the functionality of a traditional network switch or a traditional vSwitch. In certain embodiments, the vSwitches 442, 446, 451 may provide switching stacks for hardware virtualization environments, such as those including the hypervisors 443, 447, 452 and virtual machines 440, 445, 450. The vSwitches 442, 446, 451 may be configured to perform traffic filtering, VLAN isolation procedures, monitoring services including Netflow, sFlow, SPAN, RSPAN, quality-of-service functions including traffic queuing and shaping, automated control functions associated with OpenFlow and OVSDB management protocol. In certain embodiments, the vSwitches 442, 446, 451 may be configured run one or more behavior profiling algorithms 460. The behavior profiling algorithms 460 may be any known behavior profiling algorithms that may be utilized to determine behavior characteristics for a particularly entity, such as a virtual machine 440, 445, 450, a tenant, a server, and/or hypervisor. In certain embodiments, the server 140, 145, 150 may further include local storages 444, 448, and 453. The local storages 444, 448, 453 may be configured to store logs that include data associated with activities and/or actions performed by an entity. In certain embodiments, the local storages 444, 448, 453 may be configured to store one or more behavior profiling algorithms 460. In certain embodiments, the local storages 444, 448, 453 may be software, hardware, or a combination thereof.

In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, the communications network 165, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the communications network 165, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the first user device 102, the servers 140, 145, 150, 160, 170, any devices in the system 100, any other device, any network, or any combination thereof.

The database 155 may also store information and metadata obtained from the system 100, store metadata and other information associated with the first user 101, store user profiles associated with the first user 101, store device profiles associated with any device in the system 100, store communications traversing the system 100, store user preferences, store information associated with any device or signal in the system 100, store information relating to patterns of usage relating to the first user devices 102, store any information obtained from any of the networks in the system 100, store historical behavior profiles 206 for various virtual entities and devices, store device characteristics, store information relating to any devices associated with the first user 101, store new day behavior profiles 208 (i.e. behavior profiles generated for a new time period being analyzed), store reports generated by the system 100 such as profiling reports 212, 502, 504, 506, store profiling algorithms 200, 460, store information associated with bloom filters utilized in the system 100, store whitelists 602 (e.g. lists identifying non-malicious entities), store blacklists (e.g. lists identifying malicious entities), store information associated with identified malware such as malware 704, store information identifying malicious entities, store information associated with compromised servers and/or virtual entities, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include a communications network 165. In certain embodiments, the communications network 165 of the system 100 may be configured to link each of the devices in the system 100 to one another. For example, the communications network 165 may receive requests from first user device 102 and/or communications network 135. Additionally, the communications network 165 may be configured to transmit, generate, and receive any information and data traversing the system 100. In certain embodiments, the communications network 165 may include any number of servers, databases, or other componentry. The communications network 165 may also include and be connected to a cloud-computing network, a network including virtual machines, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. Illustratively, server 170 is shown as being included within communications network 165. In certain embodiments, the communications network 165 may be part of a single autonomous system that is located in a particular geographic region, or be part of multiple autonomous systems that span several geographic regions.

The system 100 may further include a server 170. In certain embodiments, the functionality of the system 100 may be supported using the server 170, however, in certain embodiments, the server 170 may be associated with a destination that the first user device 102 is attempting to access, the communications network 135 is attempting to access, the servers 140, 145, 150 are attempting to access, or any combination thereof. In certain embodiments, the server 170 may be associated with a malicious entity, may be a malicious entity, or be compromised by a malicious entity. The server 170 may reside in communications network 165, however, in certain embodiments, the server 170 may reside outside communications network 165. In certain embodiments, the server 170 may assist in performing the various operations and functions provided by the system 100. The server 170 may include a memory 171 that includes instructions, and a processor 172 that executes the instructions from the memory 171 to perform various operations that are performed by the server 170. The processor 172 may be hardware, software, or a combination thereof.

The system 100 may also include a network operation center 470. The network operation center 470 may include network monitoring and control functionality over various aspects of the system 100, such as communications network 135. The network operation center 470 may include personnel as well. In certain embodiments, the network operations center 470 may perform functions, such as, but not limited to, network monitoring functions, incident response functions for dealing with malware or other compromises occurring with an entity, communications management functions, and reporting functions. The network operation center 470 may be configured to receive any number of reports 212, 502, 504, 506 and any number of logs generated in the system 100. The reports 212, 502, 504, 506 may include any information relating to activities performed by entities. The activities performed by an entity may include, but are not limited to including, establishing connections with other entities, accessing ports, accepting connections at the entity, accessing content, accessing databases, transmitting requests for content, receiving requests for content, receiving information, transmitting packets, receiving packets, executing algorithms, an activity that may be performed by a virtual machine 440, 445, 450, any activity that may be performed by a hypervisor 443, 447, 452, any activity that may be performed by any device or software in the system 100, or any combination thereof.

Referring now to FIG. 4, FIG. 4 depicts a system 400 that illustrates traditional behavior profiling, such as profiling utilized by AT&T's™ project ASTRA. In an example scenario, system 400 logs data associated with activities performed by virtual machines 440, 445, 450 and transmits the log data from associated with these virtual machines 440, 445, 450 to a central processing system 180 for further processing. A behavior profiling algorithm 460, such as a known behavior profiling algorithm, is run on the log data by the central processing system 180. After running the behavior profiling algorithm on the log data, the central processing system 180 may generate reports 212 including information associated with the activities performed by the virtual machines 440, 445, 450, information identifying behaviors/actions of the virtual machines 440, 445, 450 during a given period of time, and network metrics associated with the behaviors/actions. Such metrics may include, but are not limited to including, a number of connections made by virtual machines 440, 445, 450, an identification of addresses accessed by the virtual machines 440, 445, 450, destinations accessed by the virtual machines, 440, 445, 450, any other information, or any combination thereof. The reports 212 may then be transmitting to a network operation center 470 so that further analysis may be conducted. In system 400, the central processing system 180 may become overloaded with processing the log data, only data in the central processing system 180 may be used for processing, log data may reach the central processing system with delays resulting in long reaction times, data storage and processing infrastructures may not always be distributed and parallel and not all data may be indexed for rapid access.

Figure 5:
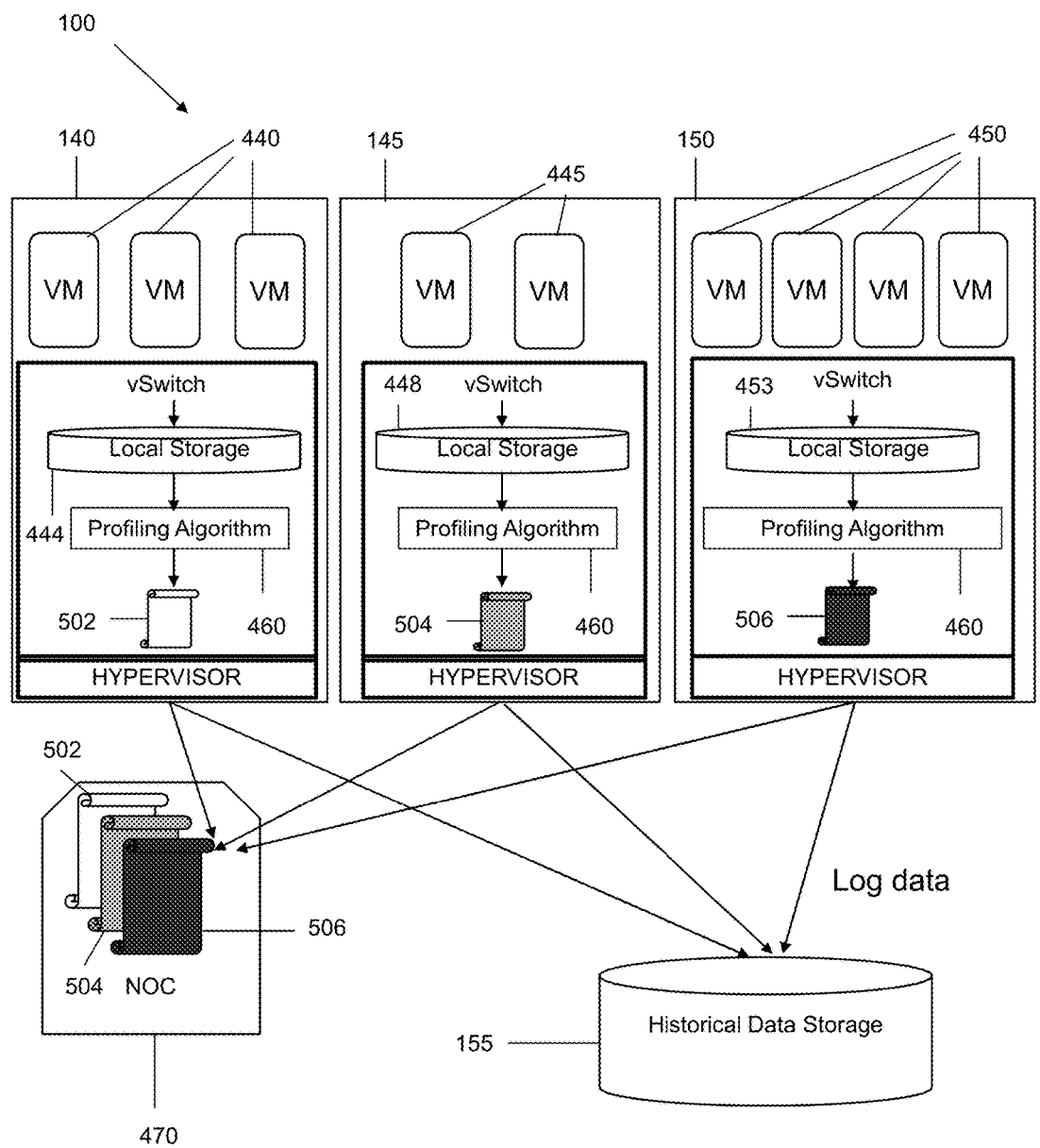
FIG. 5 illustrates a schematic diagram depicting behavior profiling performed by the system of FIG. 1.
Figure 6:
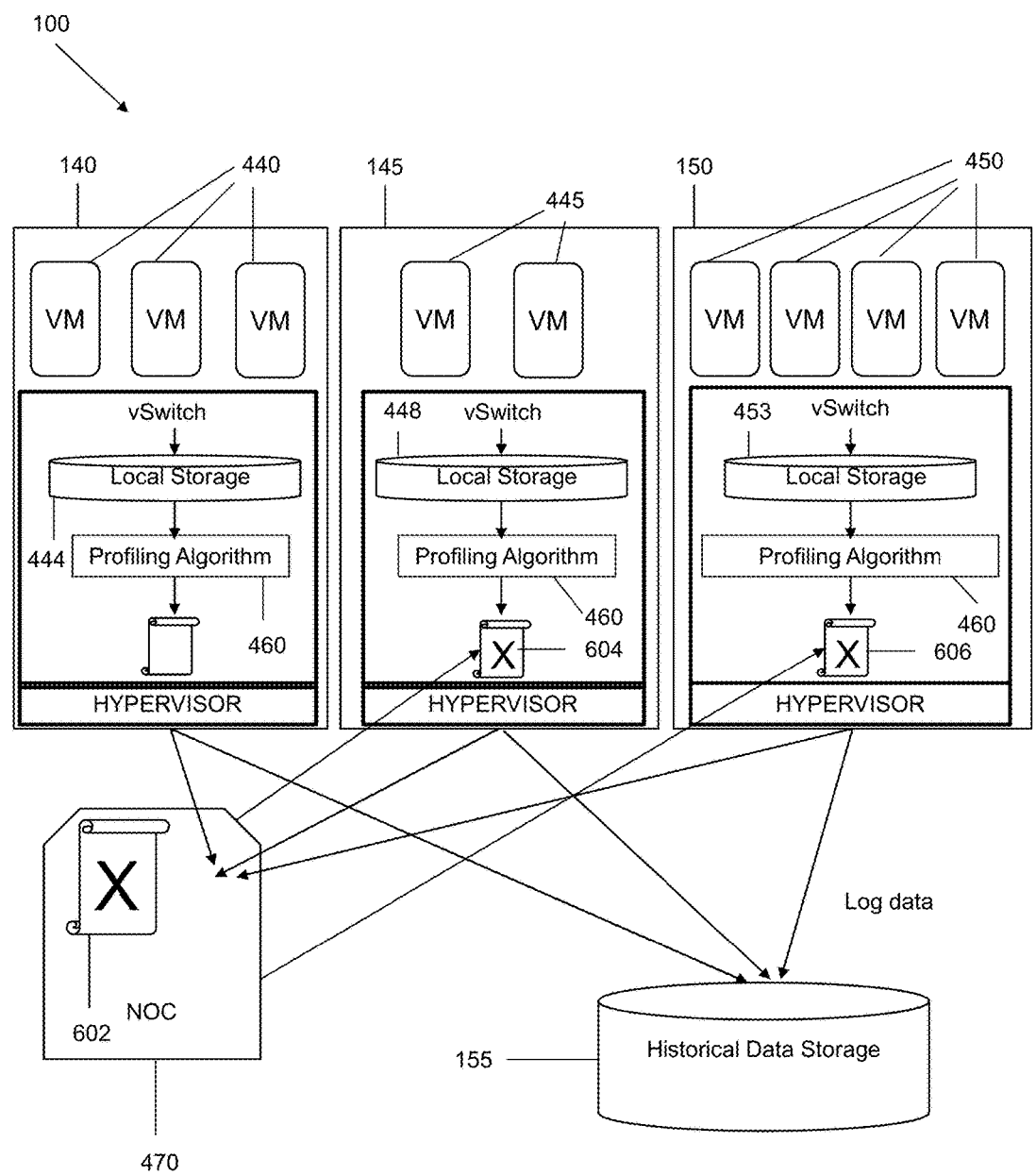
FIG. 6 illustrates a schematic diagram depicting the use of a group whitelist to reduce false positives when utilizing the system of FIG. 1.
Figure 7:
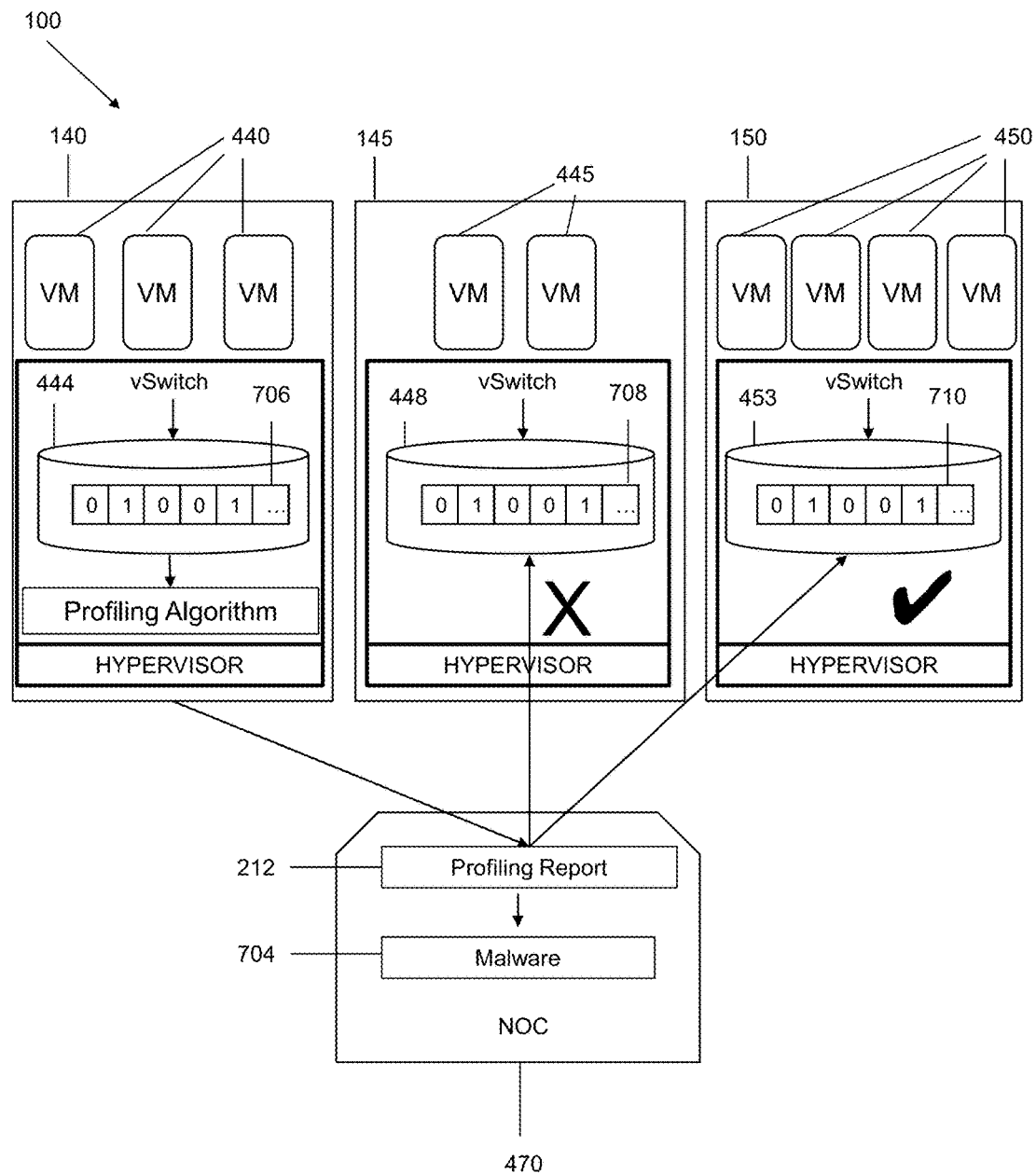
FIG. 7 illustrates a schematic diagram depicting the use of bloom filters to check for other possible compromises associated with the system of FIG. 1.

Operatively and in contrast to system 400, the system 100 may allow for distributing virtual entity behavior profiling in cloud deployments without having to transmit logs to a central processing system 180, as shown in the following exemplary scenario. Referring now to FIGS. 1-3 and 5-7, the system 100 may operate in the following manner Servers 140, 145, 150 may be important servers that are utilized for day-to-day operations for a service provider, another business, or the first user 101. For example, servers 140, 145, 150 may be directory servers or domain controllers that control applications using enterprise parameters. Hypervisors 443, 447, 452 of system 100 may create and run any number of virtual machines 440, 445, 450 respectively to perform a variety of tasks, activities, and operations, such as, but not limited to, accessing various internet-based destinations, accessing internet protocol addresses, accepting connections, providing content, receiving requests for content, any type of operation, or any combination thereof. In FIGS. 5-7, three virtual machines 440 are shown, two virtual machines 445 are shown, and four virtual machines 445 are shown, however, any number of virtual machines 440, 445, 450 may be run in the system 100.

As the virtual machines 440, 445, 450 perform the tasks, operations, and activities during a period of time, log data associated with these tasks, operations, and activities may be accessed by the corresponding vSwitches 442, 446, 451 and stored in corresponding local storages 444, 448, 453. The vSwitches 442, 446, 451, alone or in concert with the hypervisors 443, 457, 452, may run any number behavior profiling algorithms 460 on the log data associated with the activities performed by the virtual machines 440, 445, 450. For example, referring now also to FIG. 2, the behavior profiling algorithm 460 may correspond with behavior profiling algorithm 200. The behavior profiling algorithm 200 may utilize network traffic data augmented with WHOIS information for the owners of the internet protocol addresses associated with the data. Using the behavior profiling algorithm 200, for each server 140, 145, 150, the system 100 may collect behavior features for the virtual machines 440 445, 450 in a moving time window 204. The moving time window 204 may be 1 day, 7 days, a month, a year, or any other desired time window. The behavior features collected may include, but are not limited to including, destination internet protocol addresses accessed by the virtual machines 440, 445, 450, owner information for the internet protocol addresses, ports accessed by the virtual machines 440, 445, 450, activities conducted by the virtual machines 440, 445, 450, messages generated and/or received by the virtual machines 440, 445, 450, any other information or any combination thereof.

For each new time period to be analyzed, such as new day 205, the system 100 may, for example, be utilized to determine whether there are new unknown destinations (e.g. server 170) accessed during the new time period when compared to the information in historical behavior profile 206. The historical behavior profile 206 may include any historical information for a time window 204 for an entity. For example, the historical behavior profile 206 for an entity for a time window 204 may include, but is not limited to including, a list of accessed destinations, a list of ports accessed, a list of connections made, a list of content accessed or received, an average number of connections made, the type of content accessed, the types of destinations accessed, the types of connections accepted, an average number of bytes of data transmitted and/or received, average throughput information, any type of behavior information for any activity conducted by an entity, or any combination thereof. The system 100 may generate a new day (or other time period) behavior profile 208 for the new time period being analyzed, such as for new day 205.

The system 100 may determine that there are unknown internet protocol addresses associated with destinations at 210 based on the comparison of the historical behavior profile 206 and the new day behavior profile 208. Based on the determination, the system 100 may generate a new day report 212 that includes additional intelligence relating to the activities performed by the entity (e.g. virtual machines 440, 445, 450). The additional intelligence included in the report 212 may include, but is not limited to including, a number of ports accessed by the entity, an identification of the ports accessed by the entity, a number of bytes transmitted during the first selected time period, a minimum-maximum average throughput associated with data transfers associated with the entity, standard deviation values from values in the historical behavior profile 206, an identification of accepted connections made by the entity, an identification of changes in entity behavior, an identity of a number of connections made by the entity, an identification of internet protocol addresses that are victims of malware and/or a cyber-attack, any identification of times when the behavior of the entity deviates from the historical behavior profile 206, any other information, or any combination thereof.

Figure 3:
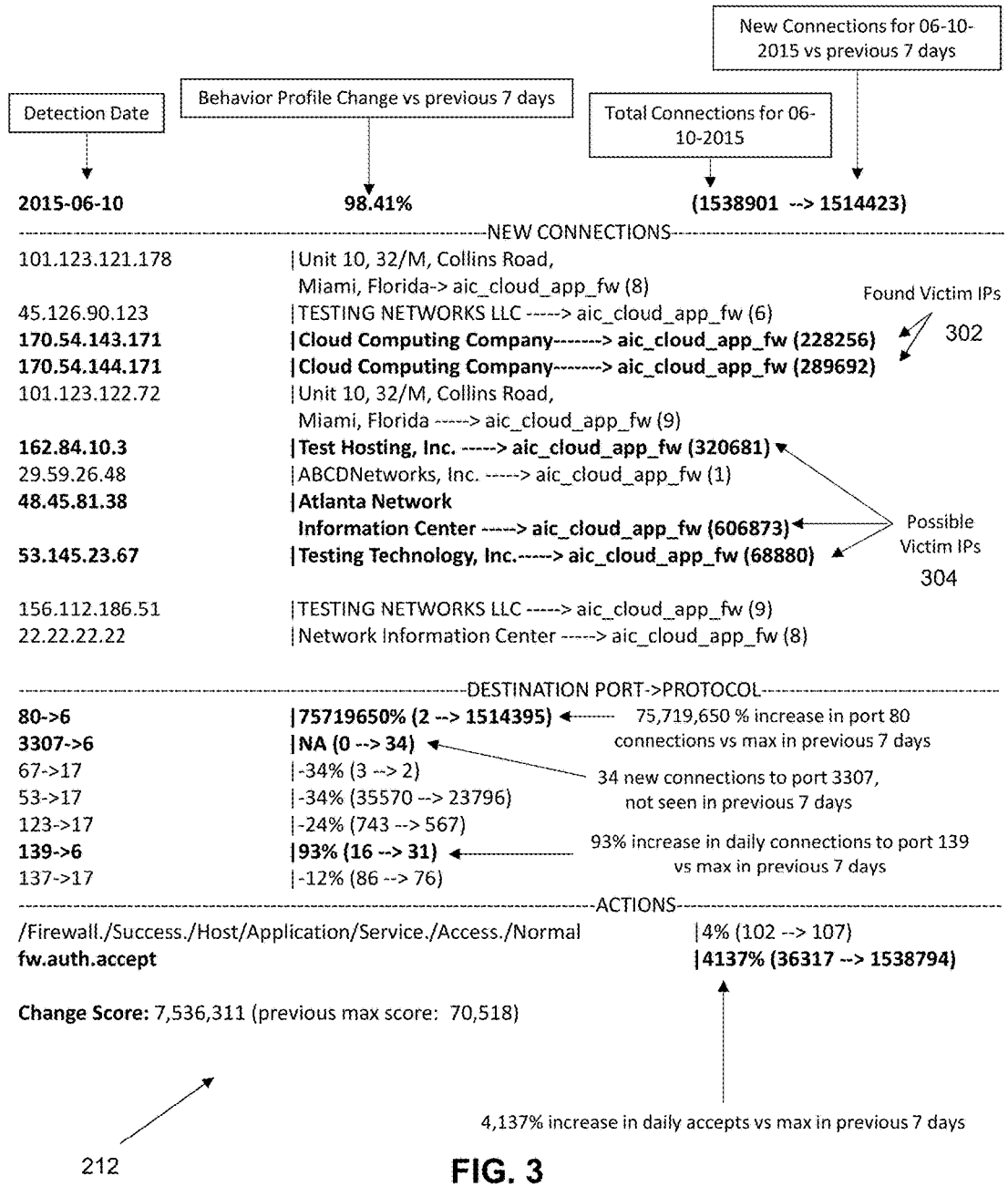
FIG. 3 is a sample report generated by the system of FIG. 1 according to an example embodiment.

Referring now also to FIG. 3, a sample report 212 is shown. The sample report 212 may be generated by the system 100 by running the behavior profiling algorithm 200, 460 on log data for a virtual machine 440, 445, 450 involved in an incident involving a denial of service attack. The algorithm 200, 460 that was run on the log data started on May 28, with an example sliding window 204 of 7 days. Notably, any number of days, months, years, or other timeframe may be utilized for the sliding window 204. A sliding window 204 of 7 days is used in FIGS. 2 and 3 for example purposes only. In this example, the system 100 each day compares the behavior profile 208 of the current day with the behavior profile 206 with the previous 7 days, until the system 100 detects a change in behavior associated with the virtual machine 440, 445, 450. The top line in the sample report 212 shows the sample detection date of Jun. 10, 2015, the percentage of new connections made by the virtual machine 440, 445, 450 to unknown internet protocol addresses vs. the previous 7 days, the total number of connections for Jun. 10, 2015, and the total number of new connections for Jun. 10, 2015 vs. the previous 7 days. Next, the report 212 shows the summary of the new connections with the internet protocol address, the internet protocol address owners, the facility reporting the events, and in parentheses the number of connections from that particular internet protocol address.

In this scenario, when the incident was initially discovered there were believed to be only two internet protocol addressed victims 302 of the denial of service attack affecting the virtual machine 440, 445, 450. However, this report 212 generated by the system 100 illustrates three other possible victims 304 that were not initially discovered. In the next section of the report 212, the report includes a summary of the destination ports and protocols observed for the virtual machine 440, 445, 450. The report 212 shows that for Jun. 10, 2015 there was a 75 million plus percent increase in connections to port 80 for the virtual machine 440, 445, 450, that there is activity to a new port 3307 that was not seen in the previous 7 days, and that there is a 93% increase in connections to port 139. The last section of the report 212 shows that there was a 4000 plus percent increase in the number of accepts by the firewall. The report 212 also includes a computed change score of about 7.5 million units vs. about 70,000 as was seen in the previous 7 days.

Returning back to the example scenario discussed above and referring to FIG. 5, once the behavior profiling algorithms 460 are run on the log data associated with the activities performed by the virtual machines 440, 445, 450 and comparisons are made between the data collected during the period of time to the historical behavior profiles 206, the system 100 may determine if a change in behavior of the virtual machines 440, 445, 450 has occurred. If a change in behavior has been determined to have occurred for the virtual machines 440, 445, 450 for the time period, the system 100 may determine if the change in behavior exceeds a threshold change. If the change in behavior exceeds the threshold change, the server 140 may generate report 502 corresponding to virtual machines 440, the server 145 may generate report 504 corresponding to virtual machines 445, and the server 150 may generate report 506 corresponding to virtual machines 450 in a distributed fashion. The reports 502, 504, 506, may include the log data for each of the virtual machines 440, 445, 450 respectively, along with additional intelligence as described in other areas of this disclosure. The reports 502, 504, 506 may be transmitted to network operation center 470 for further analysis to determine whether a compromise has occurred with the virtual machines 440, 445, 450 and/or if the virtual machines 440, 445, 450 accessed malicious entities and/or malware 704. The reports 502, 504, 506 and log data may also be sent to database 155 for storage.

Referring now also to FIG. 6, whitelists 602 may be utilized to reduce false positives associated with detecting a compromise associated with virtual machines 440, 445, 450. In FIG. 6, the report 604 may include information identifying a destination accessed by the virtual machines 445, along with the log data for the virtual machines 445. Similarly, the report 606 may include information identifying that the virtual machines 450 access the same destination, along with the log data for virtual machines 450. The system 100 may compare the information in the reports 604, 606 with the information present in the whitelist 602 to determine that the very same destination accessed by the virtual machines 445, 450 is known to be a non-malicious destination, and, thus, the virtual machines 445, 450 may not be compromised. In certain embodiments, the whitelists 602 may be compared with the log data directly to determine whether or not a virtual machine 440, 445, 450 has been compromised. In such a scenario, if the log data matches information contained in the whitelists 602, then the reports 604, 606 may not need to be generated, thereby saving processing resources and other resources of the system 100.

Referring now also to FIG. 7, the system 100 may utilize bloom filters 706, 708, 710 to check for other possible compromises associated with the virtual machines 440, 445, 450. The bloom filters 706, 708, 710 may be a string of bits that are initially all 0. The bloom filters 706, 708, 710 may be utilized to analyze segments of malware code 704 and payloads of packets associated with the virtual machines 440, 445, 450 may be placed in the bloom filters 706, 708, 710 to determine if there is a match with the segments of malware code 704. Once the payloads are inserted into the bloom filters 706, 708, 710 hash values may be created and bits may be flipped to 1. For example, in FIG. 7 a match may have been determined for virtual machines 450 (indicating malware infection), but no match was determined for virtual machines 445 (indicating no malware infection). In this way, the system 100 may determine if there are traces of malware code 704 that may have affected the virtual machines 440, 445, 450.

Figure 1:
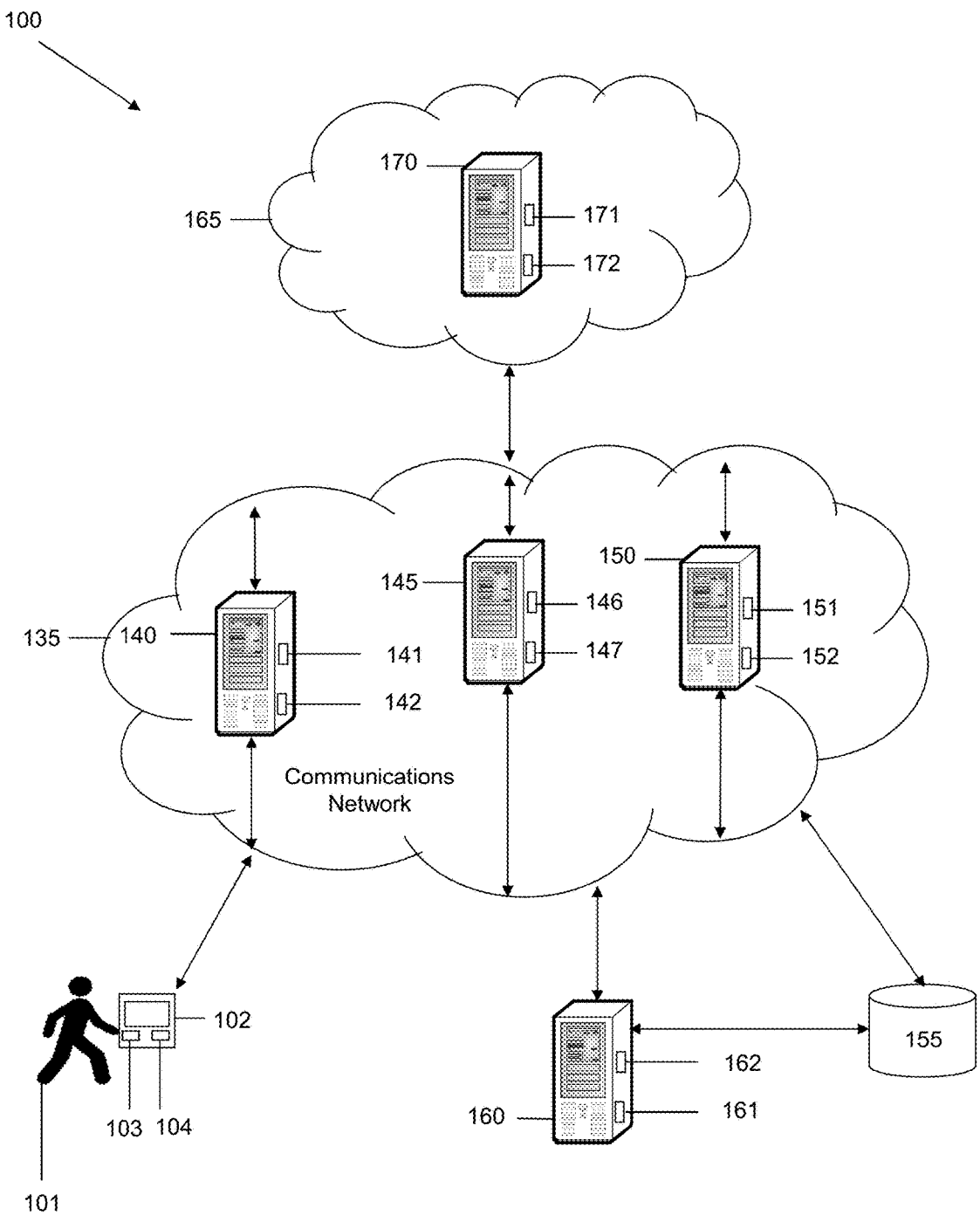
FIG. 1 is a schematic diagram of a system for distributing virtual entity behavior profiling in cloud deployments according to an embodiment of the present disclosure.
Figure 2:
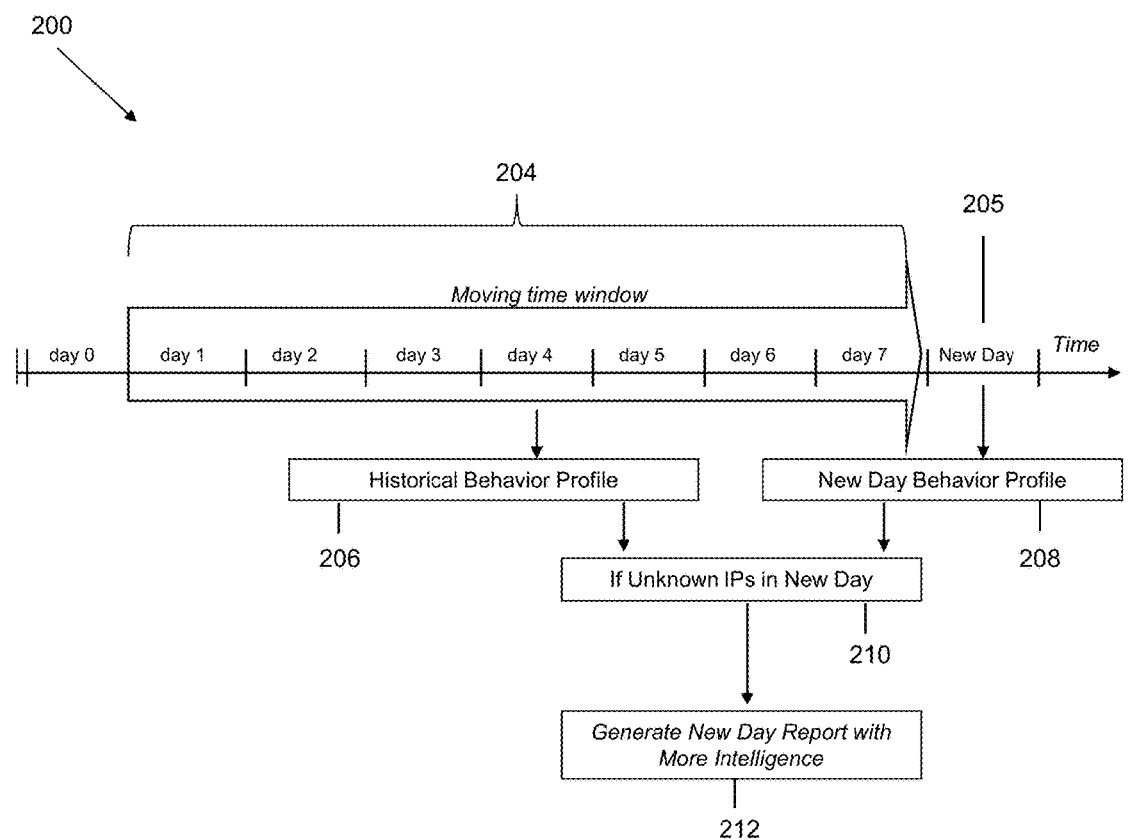
FIG. 2 is a schematic diagram illustrating use of a behavior profiling algorithm with the system of FIG. 1.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, accessing logs including data associated with activities performed by entities such as virtual machines; executing behavior profiling algorithms on the data associated with the activities performed by the entities; comparing historical behavior profiles for an entity to the data associated with the activities performed by the entity during a selected time period; determining if a change in behavior for the entity has occurred based on executing the behavior profiling algorithm on the data; generating reports including the data and more intelligence relating to the data; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-3 and 5-7 illustrate specific example configurations of the various components of the system 100, the system 100 may include any configuration of the components, which may include using a greater or lesser number of the components. For example, the system 100 is illustratively shown as including a first user device 102, a communications network 135, a server 140, a server 145, a server 150, a server 160, a communications network 165, a server 170, and a database 155. However, the system 100 may include multiple first user devices 102, multiple communications networks 135, multiple servers 140, multiple servers 145, multiple servers 150, multiple servers 160, multiple communications networks 165, multiple servers 170, multiple databases 155, or any number of any of the other components inside or outside the system 100. Furthermore, in certain embodiments, substantial portions of the functionality and operations of the system 100 may be performed by other networks and systems that may be connected to system 100.

Figure 8:
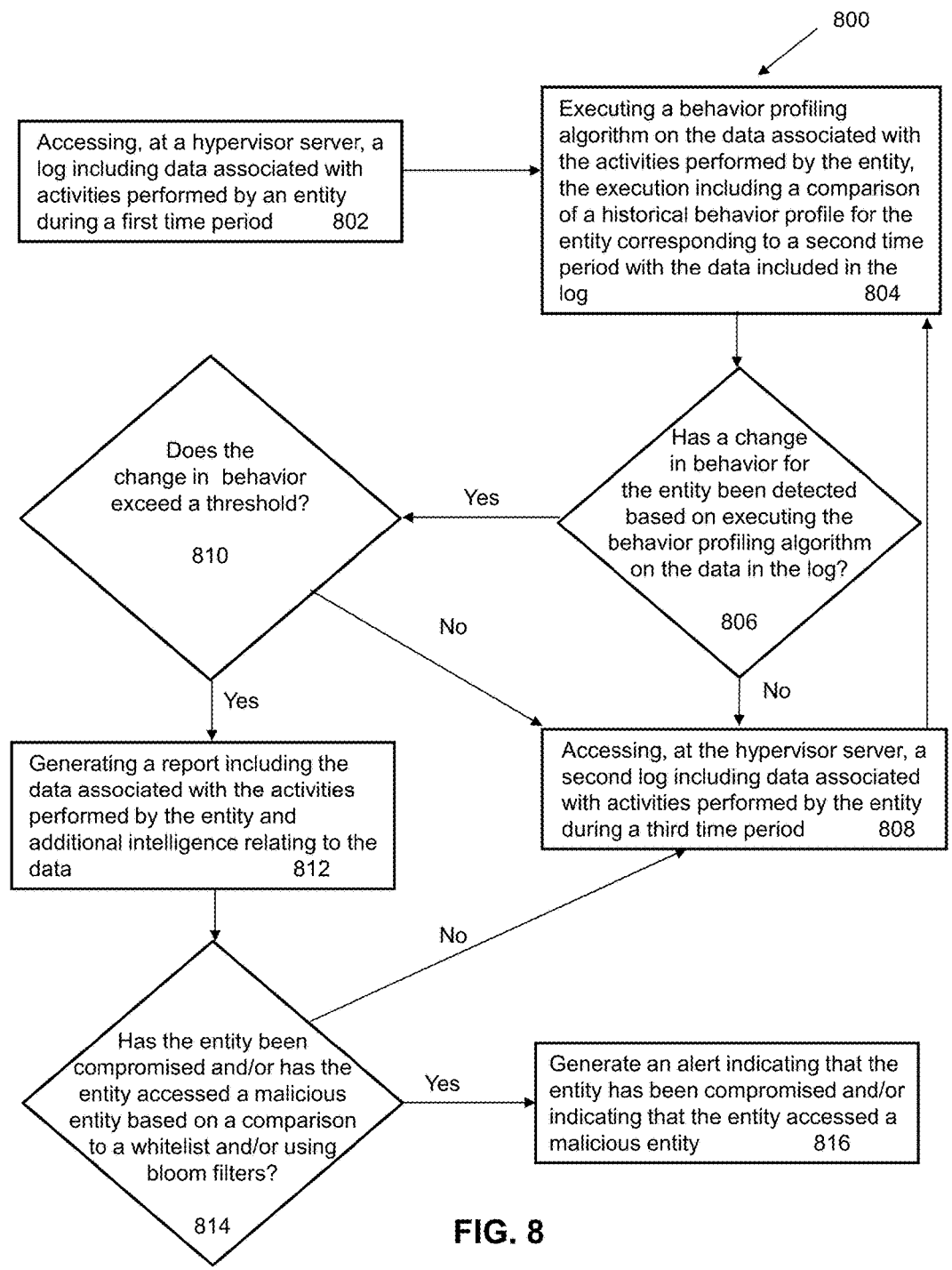
FIG. 8 is a flow diagram illustrating a sample method for distributing virtual entity behavior profiling in cloud deployments according to an embodiment of the present disclosure.

As shown in FIG. 8, an exemplary method 800 for distributing virtual entity behavior profiling in cloud deployments is schematically illustrated. The method 800 may include, at step 802, accessing and storing, at a hypervisor server, a first log including data associated with activities performed by an entity during a first time period. For example, the first log may include data associated with actions performed by a virtual machine during a certain timeframe, such as a period of days, weeks, or months. In certain embodiments, the accessing and/or storing of the log may be performed by utilizing the server 140, the server 145, the server 150, the server 160, the communications network 135, the hypervisors 443, 447, 452, the local storages 444, 448, 453, any combination thereof, or by utilizing any other appropriate program, network, system, or device. At step 804, the method 800 may include executing a behavior profiling algorithm on the data included in the first log that is associated with the activities performed by the entity. In certain embodiments, any type of known behavior profiling algorithm may be utilized. In certain embodiments, during execution of the behavior profiling algorithm, the method 800 may include comparing a historical behavior profile 206 for the entity corresponding to activities performed during a second time period with the data included in the first log. In certain embodiments, the execution of the behavior profiling algorithm and/or the comparing may be performed by utilizing the server 140, the server 145, the server 150, the server 160, the communications network 135, the hypervisors 443, 447, 452, the vSwitches 442, 446, 451, any combination thereof, or by utilizing any other appropriate program, network, system, or device.

At step 806, the method 800 may include determining if a change in behavior for the monitored entity has been detected based on executing the behavior profiling algorithm on the data in the first log. A change in behavior may have occurred if the entity accessed an unknown destination during the first time period that was not previously accessed in the second time period, for example. In certain embodiments, changes in behavior may include, but are not limited to, changes in the destinations accessed by the entity, changes in the types of connections made by the entity, changes in the ports accessed by the entity, changes in the amount of destinations accessed, changes in the types of destinations accessed by the entity, changes in the number of connections made by the entity, changes in the amount of data exchanged by the entity, changes associated with any network metric associated with the entity, changes associated the efficiency of processes conducted by the entity, any type of change or any combination thereof. The changes may be determined based on comparing the historical behavior profile 206 of the entity associated with the second time period with the log data for the activities performed by the entity during the first time period. In certain embodiments, the determination of the changes in behavior may be performed by utilizing the server 140, the server 145, the server 150, the server 160, the communications network 135, the hypervisors 443, 447, 452, the vSwitches 442, 446, 451, any combination thereof, or by utilizing any other appropriate program, network, system, or device.

If a change in behavior has not been detected after executing the behavior profiling algorithm on the data and based on comparing the historical behavior profile with the data from the first log, the method 800 may include, at step 808, accessing a second log including data associated with activities performed by the entity during a third time period. The method 800 may then proceed back to step 804 and execute the behavior profiling algorithm on the data in the second log and run the comparison with the historical behavior profile 206 with the data in the second log to determine if a change in behavior for the entity has occurred during the third time period and then proceed according to the steps of the method 800 accordingly. If, however, a change in behavior has been detected after executing the behavior profiling algorithm on the data and based on comparing the historical behavior profile 206 with the data from the first log, the method 800 may include proceeding to step 810. At step 810, the method 800 may include determining if a determined change in behavior exceeds a threshold. For example, if at step 806, it is determined that the entity had a total number of 50,000 connections made during the first time period and the threshold is 60,000 connections, then the determined change in behavior may not exceed the threshold. However, if the threshold number of connections is 40,000 connections, then the 50,000 connections made by the entity during the first time period would exceed the threshold. In certain embodiments, the determining may be performed by utilizing the server 140, the server 145, the server 150, the server 160, the communications network 135, the hypervisors 443, 447, 452, the vSwitches 442, 446, 451, any combination thereof, or by utilizing any other appropriate program, network, system, or device.

If the determined change in behavior does not exceed a threshold, the method 800 may go to step 808 and proceed with the steps of the method 800 accordingly. If, however, the determined change in behavior does exceed the threshold, the method 800 may include, proceeding to step 812. At step 812, the method 800 may include generating a report including the data associated with the activities performed by the entity during the first time period, along with additional intelligence relating to the activities and data. The additional intelligence included in the report may include, but is not limited to including, a number of ports accessed by the entity, an identification of the ports accessed by the entity, a number of bytes transmitted during the first selected time period, a minimum-maximum average throughput associated with data transfers associated with the entity, standard deviation values from values in the historical behavior profile 206, an identification of accepted connections made by the entity, an identification of changes in entity behavior, an identity of a number of connections made by the entity, an identification of internet protocol addresses that are victims of malware and/or a cyber-attack, any identification of times when the behavior of the entity deviates from the historical behavior profile 206, any other information, or any combination thereof. In certain embodiments, the report and additional intelligence may be generated by utilizing the server 140, the server 145, the server 150, the server 160, the communications network 135, the hypervisors 443, 447, 452, the vSwitches 442, 446, 451, any combination thereof, or by utilizing any other appropriate program, network, system, or device.

At step 814, the method 800 may include determining if the entity has been compromised and/or if the entity has accessed a malicious entity. For example, the method 800 may determine if the entity has been compromised and/or if the entity has accessed a malicious entity based on comparing the information from the report to a whitelist that includes information identifying non-malicious entities. Such information may include internet protocol addresses, entity names, entity types, any other information, or any combination thereof. In certain embodiments, the information in the report may be compared to a blacklist that includes information identifying malicious entities. The blacklists may include internet protocol addresses, entity names, entity types, any other information, or any combination thereof, associated with malicious entities. Additionally, the method 800 may include determining if the entity has been compromised by utilizing bloom filters to detect various types of other compromises associated with entities, such as whether an entity has been compromised by malware 704. The bloom filters may be utilized to analyze segments of malware code and payloads of a packet may be placed in the bloom filter to determine if there is a match with the segments of malware code. In this way, the method 800 may determine if there are traces of malware code that may have affected the entity. In certain embodiments, the compromise of the entity, the use of the bloom filters, and the comparison with the whitelists/blacklists may be determined by utilizing the server 140, the server 145, the server 150, the server 160, the communications network 135, the hypervisors 443, 447, 452, the vSwitches 442, 446, 451, any combination thereof, or by utilizing any other appropriate program, network, system, or device.

If the entity has not been compromised and the entity has not accessed a malicious entity, the method 800 may include reverting to step 808 and proceeding with the steps of the method 800. If, however, the entity has been determined to be compromised and/or the entity has accessed a malicious entity, the method 800 may include, at step 816, generating an alert indicating that the entity has been compromised and/or indicating that the entity accessed a malicious entity. The alert may be a visual alert, an audio alert, a text alert, or any combination thereof, which may be transmitted to the first user device 102 to be perceived by the first user 101 and/or transmitted to the network operation center 470. The alert may include an identification of the type of compromise associated with the entity, an identification of any malicious entity accessed by the entity, an identification of possible victim internet protocol addresses, any information traversing the system 100, or any combination thereof. In certain embodiments, the alert may be generated by utilizing the server 140, the server 145, the server 150, the server 160, the communications network 135, the hypervisors 443, 447, 452, the vSwitches 442, 446, 451, the first user device 102, any combination thereof, or by utilizing any other appropriate program, network, system, or device. Notably, the method 800 may further incorporate any of the features and functionality described for the system 100, or as otherwise described herein.

This systems and methods disclosed herein may include additional functionality and features. For example, the features and functionality provided by the system 100 may be added to the implementation of AT&T's™ ASTRA to provide behavior profiling for entities that are protected by ASTRA elements. Given that the data needed for behavior profiling is already collected by ASTRA sensors, adding the distributed profiling computation provides a service offering besides standard firewall and IDS/IPS services. In certain embodiments, the systems and methods may include storing the log data at each hypervisor server. Additionally, log data may be input into the behavior profiling algorithms without the need to fit or conform to a database schema. In certain embodiments, the behavior profiling algorithms may run as a daily script and generate daily reports. In further embodiments, the profiling conducted by the system 100 may utilize a global whitelist that may be updated by analysis from other reports, which may further assist in reducing false positives associated with compromises for entities. In still further embodiments, the reports generated in the system 100 may include graphs that visually display the data associated with the entities being monitored so that various entities may be compared visually with ease.

Figure 9:
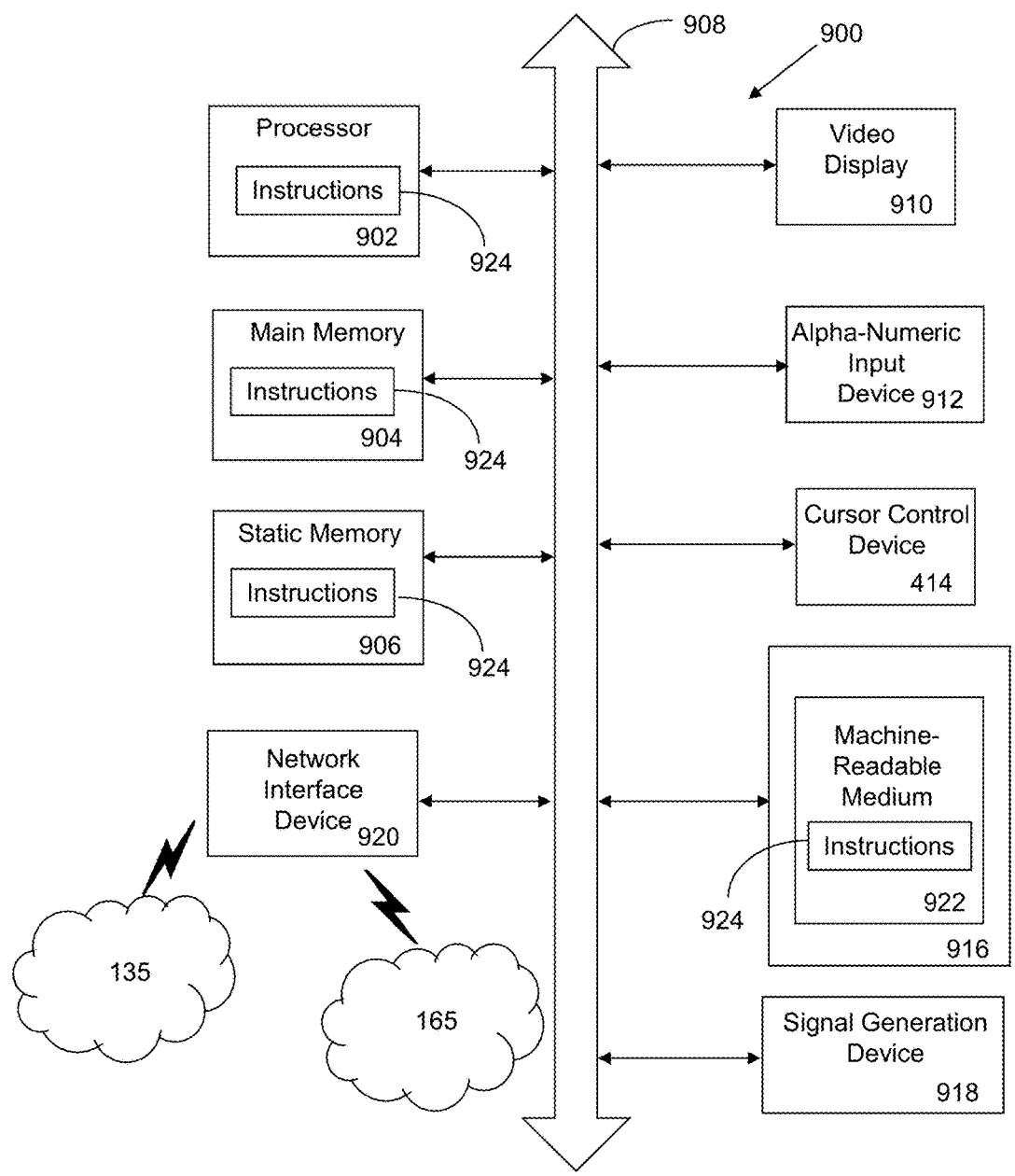
FIG. 9 is a schematic diagram of a machine in the form of a computer system within which a set of instructions, when executed, may cause the machine to perform any one or more of the methodologies or operations of the systems and methods for distributing virtual entity behavior profiling in cloud deployments.

Referring now also to FIG. 9, at least a portion of the methodologies and techniques described with respect to the exemplary embodiments of the system 100 can incorporate a machine, such as, but not limited to, computer system 900, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, communications network 165, another network, or a combination thereof) to and assist with operations performed by other machines and systems, such as, but not limited to, the first user device 102, the hypervisors 443, 447, 452, the virtual switches 442, 446, 451, the local storages 444, 448, 453, the server 140, the server 145, the server 150, the database 155, the server 160, the server 170, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. Moreover, in certain embodiments, the machine may be virtualized through technology, such as the hypervisor 1010, and may not have specific physical attributes. Such embodiments may be preferred in certain instances. For example, if the machine becomes corrupted by malware on occasion, virtualizing the machine may make it easier to discard of an existing machine, and to replace it with a new copy of the machine.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910, which may be, but is not limited to, a liquid crystal display (LCD), a flat panel, a solid state display, or a cathode ray tube (CRT). The computer system 900 may include an input device 912, such as, but not limited to, a keyboard, a cursor control device 914, such as, but not limited to, a mouse, a disk drive unit 916, a signal generation device 918, such as, but not limited to, a speaker or remote control, and a network interface device 920.

The disk drive unit 916 may include a machine-readable medium 922 on which is stored one or more sets of instructions 924, such as, but not limited to, software embodying any one or more of the methodologies or functions described herein, including those methods illustrated above. The instructions 924 may also reside, completely or at least partially, within the main memory 904, the static memory 906, or within the processor 902, or a combination thereof, during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 922 containing instructions 924 so that a device connected to the communications network 135, the communications network 165, another network, or a combination thereof, can send or receive voice, video or data, and communicate over the communications network 135, the communications network 165, another network, or a combination thereof, using the instructions. The instructions 924 may further be transmitted or received over the communications network 135, the communications network 165, another network, or a combination thereof, via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; virtual memories, disk images, or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

Figure 10:
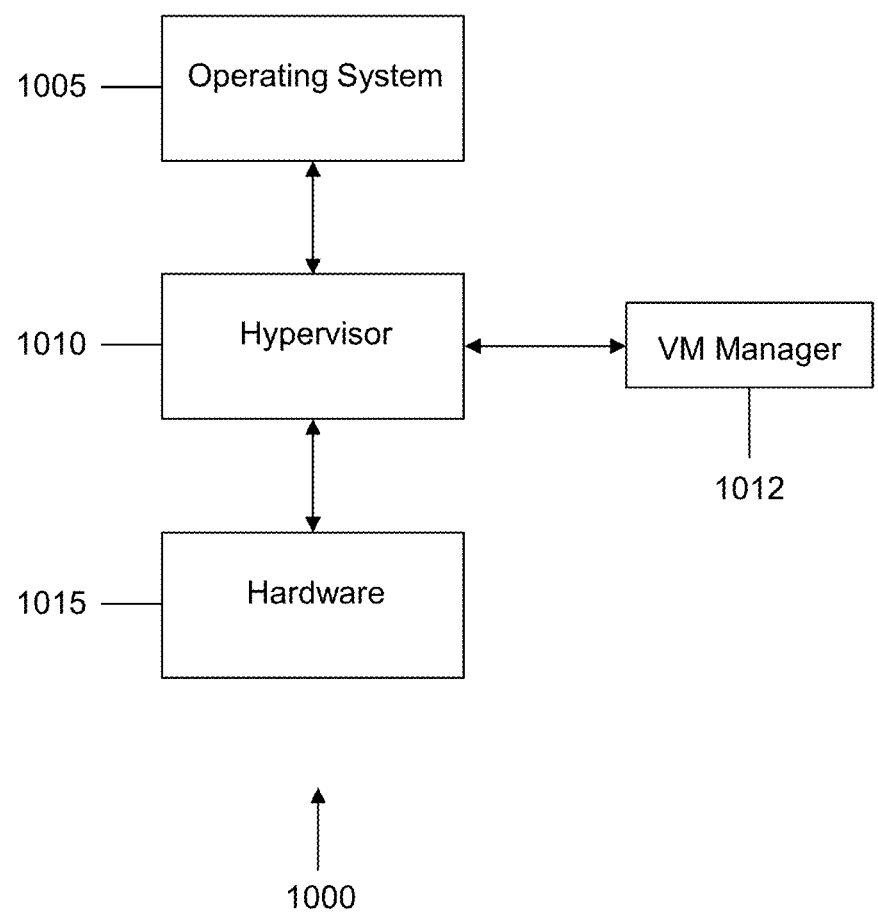
FIG. 10 is a schematic diagram providing an architecture for a virtualization process according to an embodiment of the present disclosure.

Referring now also to FIG. 10, an architecture 1000 for providing virtualization processes and virtual machines according to an embodiment of the present disclosure is shown. The architecture 1000 may include an operating system 1005, a hypervisor 1010, a virtual machine manager 1012, and hardware 1015. The operating system 1005 may be an operating system associated with virtual machines, and the hardware 1015 may correspond with any selected device of the system 100. The architecture 1000 may support virtualization techniques that may be facilitated through the use of the hypervisor 1010, which may be utilized to create the virtual machines contemplated in the present disclosure. The hypervisor 1010, in conjunction with the virtual machine manager 1012, may allow the system 100, and methods disclosed herein to more easily replace the operating system 1005 and the virtual machines. As an example, the virtual machine manager 1012 may select an image for a virtual machine to run, and may load the image into the hypervisor 1010. This may allow for virtual machines to be replaced in a rapid fashion. Furthermore, a set of browser virtual machines may reside above the hypervisor 1010, which may include the operating system 1005.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
accessing, at a hypervisor server, a log including data associated with activities performed by a virtual machine executing on the hypervisor server, wherein the activities are performed by the virtual machine during a first time period, wherein the log including the data associated with the activities performed by the virtual machine is accessed at the hypervisor server without the system transferring the log to a central processing system, thereby reducing bandwidth consumption of the system, wherein the hypervisor server is located in a same server that the log including the data is generated so as to enable faster processing of the data in the log when compared to processing the data in the log at the central processing system;
compressing and encoding the data associated with activities performed by the virtual machine into a format only usable by a behavior profiling algorithm;
executing, by utilizing the hypervisor server, the behavior profiling algorithm on the data associated with the activities performed by the virtual machine, wherein executing the behavior profiling algorithm on the data comprises comparing a historical behavior profile for the virtual machine for a second time period to the data associated with the activities performed by the virtual machine during the first time period;

determining, by utilizing the hypervisor server, if a change in behavior for the virtual machine has occurred based on executing the behavior profiling algorithm on the data associated with the activities performed by the virtual machine, wherein the change in behavior of the virtual machine is determined to have occurred based on detecting a change in a type of connection made by the virtual machine during the first time period when compared with the historical behavior profile for the second time period and based on detecting a change in an efficiency of processing conducted by the virtual machine during the first time period when compared to the historical behavior profile for the second time period; and generating, if the change in behavior is determined to have occurred and if the change in behavior exceeds a threshold, a report including the data associated with the activities performed by the virtual machine.

2. The system of claim 1, wherein the operations further comprise determining, based on an analysis of the report, if the virtual machine was compromised.

3. The system of claim 2, wherein the operations further comprise determining, if the virtual machine was compromised, an internet protocol address of a victim of a denial of service attack.

4. The system of claim 1, wherein the operations further comprise generating the report including the data associated with the activities performed by the virtual machine, wherein the report further comprises a list of destination ports accessed by the virtual machine, a number of connections made by the virtual machine during the second time period, a list of internet protocol addresses that the virtual machine established a connection with, a list of ports accessed by the virtual machine during the second time period, an identification of a type of action performed by the virtual machine during the second time period, or a combination thereof.

5. The system of claim 1, wherein the operations further comprise determining that the change in behavior for the virtual machine has occurred based upon determining that an unknown destination was accessed by the virtual machine during the second time period.

6. The system of claim 1, wherein the operations further comprise executing the behavior profiling algorithm on the data associated with the activities performed by the virtual machine at the hypervisor server.

7. The system of claim 1, wherein the operations further comprise accessing, at the hypervisor server, the log including data associated with activities performed by the virtual machine executing on the hypervisor server without transporting the log to the central processing system.

8. The system of claim 1, wherein the operations further comprise determining that an entity identified in the report is not malicious if the entity is present in a whitelist.

9. The system of claim 1, wherein the operations further comprise collecting behavior features for the virtual machine in a moving time window.

10. The system of claim 1, wherein the operations further comprise utilizing a bloom filter to detect whether the virtual machine has been compromised.

11. The system of claim 1, wherein the operations further comprise executing the behavior profiling algorithm at a virtual switch entity executing on the hypervisor server.

12. The system of claim 1, wherein the operations further comprise not generating the report if the change in behavior is not determined to not have occurred.

13. The system of claim 1, wherein the operations further comprise accessing a different log associated with different activities performed by the virtual machine during a third time period.

14. A method, comprising:

accessing, at a hypervisor server, a log including data associated with activities performed by a virtual machine executing on the hypervisor server, wherein the activities are performed by the virtual machine during a first time period, wherein the log including the data associated with the activities performed by the virtual machine is accessed at the hypervisor server without the system transferring the log to a central processing system, thereby reducing bandwidth consumption of the system, wherein the hypervisor server is located in a same server that the log including the data is generated so as to enable faster processing of the data in the log when compared to processing the data in the log at the central processing system;

compressing and encoding the data associated with activities performed by the virtual machine into a format only usable by a behavior profiling algorithm;

executing, by utilizing the hypervisor server, the behavior profiling algorithm on the data associated with the activities performed by the virtual machine, wherein executing the behavior profiling algorithm on the data comprises comparing a historical behavior profile for the virtual machine for a second time period to the data associated with the activities performed by the virtual machine during the first time period;

determining, by utilizing instructions from a memory that are executed by a processor and by utilizing the hypervisor server, if a change in behavior for the virtual machine has occurred based on executing the behavior profiling algorithm on the data associated with the activities performed by the virtual machine, wherein the change in behavior of the virtual machine is determined to have occurred based on detecting a change in a type of connection made by the virtual machine during the first time period when compared with the historical behavior profile for the second time period and based on detecting a change in an efficiency of processing conducted by the virtual machine during the first time period when compared to the historical behavior profile for the second time period; and generating, if the change in behavior is determined to have occurred and if the change in behavior exceeds a threshold, a report including the data associated with the activities performed by the virtual machine.

15. The method of claim 14, further comprising determining, based on an analysis of the report, if the virtual machine was compromised.

16. The method of claim 15, further comprising determining, if the virtual machine was compromised, an internet protocol address of a victim of a denial of service attack.

17. The method of claim 16, further comprising generating an alert identifying the victim of the denial of service attack.

18. The method of claim 14, further comprising determining that an entity identified in the report is not malicious if the entity is present in a whitelist.

19. The method of claim 14, further comprising determining that the change in behavior for the virtual machine has occurred based upon determining that an unknown destination was accessed by the virtual machine during the second time period.

20. A computer-readable device comprising instructions, which when executed by a processor, cause the processor to perform operations comprising:

accessing, at a hypervisor server, a log including data associated with activities performed by a virtual machine executing on the hypervisor server, wherein the activities are performed by the virtual machine during a first time period, wherein the log including the data associated with the activities performed by the virtual machine is accessed at the hypervisor server without the system transferring the log to a central processing system, thereby reducing bandwidth consumption of the system, wherein the hypervisor server is located in a same server that the log including the data is generated so as to enable faster processing of the data in the log when compared to processing the data in the log at the central processing system;

compressing and encoding the data associated with activities performed by the virtual machine into a format only usable by a behavior profiling algorithm;

executing, by utilizing the hypervisor server, the behavior profiling algorithm on the data associated with the activities performed by the virtual machine, wherein executing the behavior profiling algorithm on the data comprises comparing a historical behavior profile for the virtual machine for a second time period to the data associated with the activities performed by the virtual machine during the first time period;

determining, by utilizing the hypervisor server, if a change in behavior for the virtual machine has occurred based on executing the behavior profiling algorithm on the data associated with the activities performed by the virtual machine, wherein the change in behavior of the virtual machine is determined to have occurred based on detecting a change in a type of connection made by the virtual machine during the first time period when compared with the historical behavior profile for the second time period and based on detecting a change in an efficiency of processing conducted by the virtual machine during the first time period when compared to the historical behavior profile for the second time period; and generating, if the change in behavior is determined to have occurred and if the change in behavior exceeds a threshold, a report including the data associated with the activities performed by the virtual machine.

* * * * *